United States Patent [19]

Nap et al.

[11] Patent Number: 4,746,724

[45] Date of Patent: May 24, 1988

[54] HYDROLYTIC PROCESS FOR THE PREPARATION OF A MELT STABLE POLYCAPROLACTAM

[75] Inventors: Christiaan Nap, Schinnen; Robert Kirschbaum, Limbricht; Pierre J. Franssen, Schinnen, all of Netherlands

[73] Assignee: Stamicarbon, B.V., Netherlands

[21] Appl. No.: 874,997

[22] Filed: Jun. 16, 1986

[30] Foreign Application Priority Data

Jul. 16, 1985 [NL] Netherlands ........................ 8502038

[51] Int. Cl.$^4$ ............................................. C08G 69/16
[52] U.S. Cl. .................................... 528/318; 528/315; 528/323
[58] Field of Search .................... 528/318, 315, 323; 525/419, 420

[56] References Cited

U.S. PATENT DOCUMENTS

| | | | |
|---|---|---|---|
| 3,578,640 | 5/1971 | Twilley et al. | 528/315 |
| 4,366,306 | 12/1982 | Smith | 528/315 |
| 4,429,107 | 1/1984 | Strehler et al. | 528/318 |

*Primary Examiner*—Harold D. Anderson
*Attorney, Agent, or Firm*—Cushman, Darby & Cushman

[57] ABSTRACT

The invention relates to a process for the preparation of a caprolactam that is not appreciably subject to re-equilibration during melt spinning of textile fibres. In the process such an amount of chain length regulating agent is used that the relative viscosity of the polyamide increases by not more than 0.5 units after 20 hour heat treatment in the solid phase in an inert gas atmosphere at between 110° C. and 190° C., after extraction.

9 Claims, No Drawings

HYDROLYTIC PROCESS FOR THE PREPARATION OF A MELT STABLE POLYCAPROLACTAM

The invention relates to a process for the preparation of a polycaprolactam that is not appreciably subject to re-equilibration during melt spinning of textile fibres.

Polycaprolactam for melt spinning of textile fibres is usually obtained by polymerization of ε-caprolactam in the presence of water. A slight amount of chain length regulating agent is also added. After the equilibrium state has been attained, the polymerizate obtained is cooled and granulated or shaped in another way. This granulate is subsequently extracted using an excess of water so as to remove monomer and oligomer residues. Thus purified, the polyamide is subsequently dried and stored in an inert atmosphere until it is subjected to the spinning process. For the spinning process, the granulate is molten in an extruder and transported to the various spinning heads via a distributing device. This will be attended by a reaction in the direction of re-equilibration between (inter alia) monomer, water and polymer. This process is described in further detail in H. K. Reimschüssel and K. Nagasubramanian, Polymer Engineering and Science, 12, 179 (1972). The effect on the melt viscosity is described by K. Dietrich, S. Tolsdorf and G. Reinisch, Faserforschung und Textiltechnik 23, 325 (1972).

Depending on, for instance, the water content, polymer degradation or after-polycondensation may take place. The rate at which this reaction proceeds is determined by, inter alia, the temperature and the water content, the melt: gas volume ratio and the rate of the transport processes of the substances involved in the reaction.

In melt spinning it is attempted to attain the highest possible spinning rate up to 100 m/sec. To this end, very high melt draw ratios are applied, while in the spinning head and spinning lines higher temperatures are used for sufficient reduction of the melt viscosity.

On account of these higher temperatures, the rate of the re-equilibration reactions is increased. As a consequence, minor fluctuations in the temperature and the residence time, e.g. by incomplete mixing and heat transfer, will sooner result in fluctuations in the degree of polymerization and the molecular weight distribution. Especially variations in after-polycondensation result in large melt viscosity variations, by which they interfere with the regularity of the melt drawing process, which in the rapid spinning process at a draw ratio of, say, 200, is extremely sensitive to minor fluctuations in melt viscosity.

A person skilled in the art will, therefore, try to supply a polyamide with minimal sensitivity to residence time and temperature variations in the melt and especially with little tendency to after-polycondensation. FR-A-1,221,413 discloses a method for obtaining stable linear polyamides. After the polymerization, the polyamide is treated not with water but at elevated temperature, with a large amount of dilute acid, resulting in neutralization of —NH$_2$ groups present in the polyamide. This treatment is very time-consuming and its effect will to a large degree be determined by the uniformity of the granulate dimensions; in addition, various undesirable side reactions occur. The acid extraction water further presents a problem in that it must be treated. NL-A-6918295 describes a process in which the polyamide is made to react with diacylamides in the melt. All these processes aim at treatment of the polyamide after polymerization and require a separate chemical treatment.

We have now invented a process in which a separate chemical treatment of the polymerizate is no longer necessary and which yields, in a reproducible manner, a polyamide which does not exhibit any appreciable re-equilibration in the melt under the customary processing conditions. According to the invention, this is achieved by controlling the amount of chain length regulating agent in the polymerization reaction, the amount used being larger than that used under the customary conditions for obtaining a polyamide that can directly be processed into textile yarn, and subsequently subjecting the polyamide thus obtained to a heat treatment.

The invention provides a process for the preparation of melt-stable polyamide for melt spinning of textile yarn, consisting mainly of polycaprolactam, by polymerization of ε-caprolactam, if desired in the presence of a minor amount of one or more other monomers, and in the presence of water and a chain length regulating agent, followed by extraction for removal of non-converted monomer and oligomer, characterized in that such an amount of chain length regulating agent is used that the relative viscosity of the polyamide, measured on a solution of 1 g polymer in 100 ml 96 wt.% sulphuric acid in water at 25° C., increases by not more than 0.5 unit after 20 hours during the heat treatment in the solid phase, which is effected in an inert gas atmosphere or under a vacuum and at a temperature between 110° C. and 190° C., after extraction.

The process according to the invention is suitable for polycaprolactam or copolyamides containing at least 85% polycaprolactam and at most 15% of, for instance, polyhexamethylene adipamide, polytetramethylene adipamide, polylauryllactam or other poly-C$_6$-C$_{12}$ lactams.

The polymerization is effected under the customary conditions at a temperature between 230° and 280° C. during 15 hours. The water content is between 0.1 and 10 wt.%, more in particular between 0.2 and 1.0, relative to the amount of ε-caprolactam under atmospheric conditions.

As chain-length regulating agent use can be made of non-volatile compounds exhibiting mono- or polyfunctionality relative to the amine or carboxyl group. Typical carboxyl-reactive substances are, for instance, amines, such as n-butylamine, aniline and hexamethylene diamine. Preference is given to monofuntional amines.

Suitable amine-reactive chain length regulating substances are mono- and polyfunctional carboxylic acids such as propionic acid and adipic acid, in particular monocarboxylic acids, and more in particular acetic acid and benzoic acid.

Preference is given to an acid chain length regulating agent or a mixture of these agents, since this also serves as polymerization catalyst.

Upon completion of the polymerization, the polymerizate is brought into the solid state, for instance as granules, from the melt, for instance by cooling, and extracted and dried in the usual manner. The dried polymerizate is subsequently subjected to a heat treatment at a temperature between 110° C. and 190° C., by preference between 120° C. and 170° C., this being effected in an inert atmosphere or at reduced pressure in the solid phase during 2 to 20 hours, but by preference for such a duration that there is no appreciable change in the viscosity of the polymerizate.

The amount of chain length regulating agent in the polymerization process is chosen such that the relative viscosity of the polyamide, measured on a solution of 1 g polymer in 100 ml 96 wt.% sulphuric acid in water at 25° C., will increase by not more than 0.5 unit during the heat treatment, preferably by not more than 0.4 unit and even more preferably by not more than 0.3 unit.

The polyamide obtained after this heat treatment does not exhibit any appreciable after-polycondensation in the melt, as a result of which there is significantly less breakage in rapid spinning processes with winding rates of 50–100 m/sec and melt draw ratios of up to 200 as well as in the stretching-texturing process that may follow it, in comparison with the use of polyamide prepared by conventional methods.

The invention will be elucidated on the basis of the following examples.

EXAMPLE I

In an 80-l batch reactor, 40 kg ε-caprolactam, 4.0 l distilled water and 259 g benzoic acid (0.6 mole % relative to ε-caprolactam are heated to 250° C. in 1.5 hours, the reactor pressure being limited to 6 kg/cm² by means of a control valve. This situation is maintained for 0.5 hours, after which the pressure is decreased in a controlled manner to 1 kg/cm² in a 2-hour period. Polymerization is subsequently continued for 4.0 hours at a temperature of 260° C. and atmospheric conditions, and the Nylon melt is spun into strands and chopped to granulate. After sevenfold extraction, each time with 80 l water, followed by drying of the polyamide chips at 65° C. during 48 hours, the yield is 34.8 kg Nylon 6 with an extractable content of 0.3 wt.%. The properties of this Nylon 6 are given in Table 1.

During the heat treatment in the solid phase, for which use is made of a tumble drier at a temperature of 190° C. and a steam/nitrogen environment (wt. ratio 2:5) for reduction of the partial pressure of the water, a slight degree of after-condensation occurs. The relative viscosities obtained as a function of the after-condensation time are also presented in Table I.

EXAMPLE II

The polymerization procedure is as in Example I. The polymerization is continued at 240° C. instead of at 260° C.

EXAMPLE III

As in Example I, but not with 0.5 mole % benzoic acid as the chain regulating agent.

EXAMPLE IV

As in Example I, but now with 0.65 mole % acetic acid as chain regulating agent.

COMPARATIVE EXAMPLE 1

Using a polymerization procedure as in Example I, but now with a customary chain regulator content of 0.3 mole % benzoic acid, a polymer was obtained that could directly (without after-condensation) be used for processing into a textile yarn. This in contrast to the polymers of Examples 1 through 4, all of which (without the heat treatment) have such a low relative viscosity that the mechanical properties of yarns spun from them do not meet the relevant requirements.

COMPARATIVE EXAMPLE 2

Using a polymerization procedure as in Example I, but without any chain-regulating agent and the polymerization is continued at a pressure of 1.2 bar instead of atmospheric pressure and lasting 6 hours rather than 4 hours, a polymer was obtained the molecule length (relative viscosity) of which was comparable to that of Comparative example 1. On the basis of its relative viscosity, this polyamide, too, can be used for spinning into textile yarn.

TABLE 1

| | Polymerization | | | Heat treatment | | |
|---|---|---|---|---|---|---|
| | Type of chain-regulator | Mole % | $\eta_{rel}$ after extr. | Temp. °C. | Residence time, in hours | $\eta_{rel}$ | $\Delta \eta_{rel}$ |
| Example | | | | | | | |
| I | | | | | | | |
| a | benzoic acid | 0.6 | 2.09 | 190 | 2.5 | 2.30 | 0.21 |
| b | benzoic acid | 0.6 | 2.09 | 190 | 7.0 | 2.42 | 0.33 |
| c | benzoic acid | 0.6 | 2.09 | 190 | 18.0 | 2.49 | 0.40 |
| II | benzoic acid | 0.6 | 2.13 | 180 | 15.0 | 2.53 | 0.40 |
| III | | | | | | | |
| a | benzoic acid | 0.5 | 2.21 | 190 | 18.0 | 2.65 | 0.44 |
| b* | benzoic aicd | 0.5 | 2.21 | 190 | 16.0 | 2.64 | 0.43 |
| IV | acetic acid | 0.65 | 2.10 | 190 | 18.0 | 2.48 | 0.38 |
| Comp. example | X | X | X | X | X | X | X |
| 1 | | | | | | | |
| a | benzoic acid | 0.3 | 2.40 | 190 | 6.0 | 3.02 | 0.62 |
| b | benzoic acid | 0.3 | 2.40 | 190 | 12.0 | 3.11 | 0.71 |
| 2 | acetic acid | — | 2.39 | 180 | 12.0 | 3.05 | 0.66 |

To determine the stability of some of the polymers of the examples, the polyamide chips are molten after a standard drying procedure (48 hours, 65° C.) and kept at a temperature of 265° C. for a certain time. After cooling, the relative viscosity is again determined so as to obtain an impression of the after-condensation in the melt. The results are included in Table 2.

TABLE 2

| Polymer | Temperature °C. | Residence time (min.) | $\eta_{rel}$ | $\Delta \eta_{rel}$ |
|---|---|---|---|---|
| Example No. | | | | |
| I b | 265 | 4 | 2.42 | 0.00 |
| | 265 | 12 | 2.43 | 0.02 |
| | 265 | 24 | 2.44 | 0.03 |
| Comparative Example | | | | |
| 1 | 265 | 12 | 2.55 | 0.15 |
| | 265 | 24 | 2.63 | 0.21 |
| 2 | 265 | 12 | 2.76 | 0.21 |

From the above experiment it is very clear that the polyamide of Example 1b, obtained by the process of the invention, exhibits very high stability in the melt, whereas the polyamides of Comparative examples 1 and 2, obtained according to the state of the art, still undergo a considerable change in relative viscosity during the indicated short time in the melt.

EXAMPLE V AND COMPARATIVE EXAMPLE 3

In a commercial plant, the amount of chain terminator customary according to the state of the art, 0.2 mole % acetic acid is increased to 0.35 mole %. The polymerization reaction takes place under identical conditions, as do the subsequent processing into chips and extraction of the chips. For spinning purposes, the chips thus obtained are subjected to a heat treatment in a nitrogen atmosphere at atmospheric pressure. During this heat treatment, which lasts about 18 hours, the relative viscosity of the Nylon 6 increases from about 2.4 to 2.49.

In a comparative experiment the polymer is prepared, extracted and dried according to the state of the art, i.e. the customary small amount of chain terminator of 0.20 mole % acetic acid is used. This polymer has a relative viscosity of 2.51.

Of the above-mentioned polymers, 2 types of yarn are spun, vis.:
  a. Oxford yarn (210 denier/34 filaments)
  b. partially oriented yarn (POY) (70 denier/24 filaments).

The spinning conditions and the spinnability and breakage figures for both polymers are given in Table 3.

As the experiments had to be conducted within an existing production plant, with all associated drawbacks, only a limited increase in the amount of chain terminator could be tested. In spite of this, it is remarkable that such a substantial improvement in the spinning breaks frequence in the production of the partially oriented yarn (PYO) is realized by use of the process according to the invention in comparison with the comparative example according to the state of the art.

TABLE 3

| | Oxford | | POY | |
| | Example V | Comp. Example 3 | Example V | Comp. Example 3 |
|---|---|---|---|---|
| winding rate m/min. | 1000 | 1000 | 4800 | 4800 |
| melt draw ratio | 25 | 25 | 195 | 195 |
| spinning breaks frequence [day$^{-1}$] | none | none | 0.215 | 0.66 |

TABLE 3-continued

| | Oxford | | POY | |
| | Example V | Comp. Example 3 | Example V | Comp. Example 3 |
|---|---|---|---|---|
| drawing breaks [%] (draw ratio 3,5) | 9.0 | 11.5 | n.a. | n.a. |
| draw-twisting breaks [%] (draw ratio 1.2) | n.a. | n.a. | 5.5 | 8.0 |

We claim:

1. A process for the preparation of a melt-stable polyamide for the melt spinning of textile yarn comprising, polymerizing E-caprolactam monomer in the presence of water and a chain length regulating agent, to form a polycaprolactam; solidifying said polycaprolactam, then extracting and drying said polycaprolactam; and subjecting the dried polycaprolactam to a heat treatment wherein said heat treatment is conducted at a temperature from about 110° to about 190° C., and in an inert gas atmosphere or under a vacuum for a period between about 2 and about 20 hours; and wherein said chain length regulating agent is present in an amount whereby the relative viscosity of the polyamide, measured on a solution of 1 g polymer in 100 ml 96 wt% sulphuric acid in water at 25° C., increases by not more than 0.5 unit during said heat treatment.

2. The process of claim 1, wherein the relative viscosity of the polycaprolactam increases by not more than 0.4 unit.

3. The process of claim 1, wherein the relative viscosity of the polycaprolactam increases by not more than 0.3 unit.

4. The process of claim 1, wherein the heat treatment is continued until the relative viscosity reaches a constant value.

5. The process of claim 1, wherein the relative viscosity of the polycaprolactam after the heat treatment is from about 2.1 to about 2.65.

6. The process according to claim 5, wherein the relative viscosity of the polycaprolactam after the heat treatment is from about 2.2 to about 2.5.

7. The process of claim 1, wherein the chain length regulating agent is a monocarboxylic acid or a monofunctional amine.

8. The process according to claim 7, wherein the chain length regulating agent is a monocarboxylic acid.

9. The process according to claim 8, wherein the monocarboxylic acid is benzoic acid or acetic acid.

* * * * *